(12) United States Patent
Song et al.

(10) Patent No.: US 9,618,396 B1
(45) Date of Patent: Apr. 11, 2017

(54) THERMOMAGNETIC RESONATOR-BASED TEMPERATURE SENSING

(71) Applicant: HRL Laboratories, LLC, Malibu, CA (US)

(72) Inventors: Hyok J Song, Oak Park, CA (US); Chia-Ming Chang, Agoura Hills, CA (US)

(73) Assignee: HRL Laboratories, LLC, Malibu, CA (US)

( * ) Notice: Subject to any disclaimer, the term of this patent is extended or adjusted under 35 U.S.C. 154(b) by 562 days.

(21) Appl. No.: 14/176,020

(22) Filed: Feb. 7, 2014

Related U.S. Application Data

(60) Provisional application No. 61/798,499, filed on Mar. 15, 2013.

(51) Int. Cl.
*G01K 11/00* (2006.01)
*G01K 7/00* (2006.01)
*G01K 7/36* (2006.01)

(52) U.S. Cl.
CPC ...................................... *G01K 7/36* (2013.01)

(58) Field of Classification Search
USPC .......................................... 374/117, 176, 184
See application file for complete search history.

(56) References Cited

U.S. PATENT DOCUMENTS

| | | | |
|---|---|---|---|
| 1,697,148 A | 1/1929 | Spooner | |
| 2,350,329 A | 6/1944 | Homfeck | |
| 3,164,993 A | 1/1965 | Schmidt | |
| 3,421,374 A | 1/1969 | Wieting et al. | |
| 3,848,466 A | 11/1974 | Dial et al. | |
| 3,950,993 A * | 4/1976 | Sidor | G01K 7/38 324/203 |
| 5,766,793 A | 6/1998 | Kameishi et al. | |
| 5,775,810 A | 7/1998 | Shin | |
| 5,898,356 A | 4/1999 | Gascoyne et al. | |
| 6,208,253 B1 | 3/2001 | Fletcher et al. | |

(Continued)

FOREIGN PATENT DOCUMENTS

WO      2011106825 A2      9/2011

OTHER PUBLICATIONS

Bozorth, R. M., "Ferromagnetism," D. Van Nostrand Company, 1951, pp. 720-723.

(Continued)

*Primary Examiner* — Mirellys Jagan
(74) *Attorney, Agent, or Firm* — North Shore Associates

(57) ABSTRACT

A thermomagnetic temperature sensor, a temperature measurement system and a method of measuring temperature employ a temperature-dependent resonant frequency of a thermomagnetic resonator to measure temperature. The thermomagnetic temperature sensor includes a thermomagnetic inductor and a capacitor connector to form the thermomagnetic resonator. The thermomagnetic inductor includes a ferromagnetic material having a temperature-dependent magnetic permeability to determine the temperature-dependent resonant frequency. A predetermined relationship between the temperature-dependent resonant frequency and temperature in a range between a maximum magnetic permeability value and a Curie temperature provides the measurement of temperature.

17 Claims, 5 Drawing Sheets

(56) References Cited

U.S. PATENT DOCUMENTS

| | | | |
|---|---|---|---|
| 6,210,824 B1 | 4/2001 | Sullivan et al. | |
| 6,806,808 B1* | 10/2004 | Watters | G01D 5/48 |
| | | | 340/10.41 |
| 6,904,378 B2 | 6/2005 | Schilling et al. | |
| 7,595,128 B2 | 9/2009 | Lee et al. | |
| 7,794,142 B2 | 9/2010 | Clothier et al. | |
| 8,251,581 B2 | 8/2012 | Clothier et al. | |
| 8,606,808 B2* | 12/2013 | Srikrishna | G06F 17/30864 |
| | | | 707/765 |
| 2002/0154029 A1* | 10/2002 | Watters | G01D 5/48 |
| | | | 340/870.07 |
| 2004/0122494 A1* | 6/2004 | Eggers | A61B 18/04 |
| | | | 607/103 |
| 2008/0285619 A1* | 11/2008 | Thompson | G01K 7/32 |
| | | | 374/136 |
| 2010/0006562 A1* | 1/2010 | Clothier | G01K 1/024 |
| | | | 219/494 |
| 2010/0276501 A1* | 11/2010 | Yoshimura | A61B 5/01 |
| | | | 236/101 R |
| 2011/0090937 A1 | 4/2011 | Malyshev et al. | |
| 2012/0146575 A1* | 6/2012 | Armstrong | H02J 7/025 |
| | | | 320/108 |
| 2013/0167872 A1* | 7/2013 | Weston | A61L 2/04 |
| | | | 134/18 |
| 2014/0159652 A1* | 6/2014 | Hall | H02J 5/005 |
| | | | 320/108 |

OTHER PUBLICATIONS

Brito, V. L. O. et al., "Evaluation of a Ni—Zn Ferrite for Use in Temperature Sensors," Progress in Electromagnetics Research Letters, vol. 13, 2010, pp. 103-112.

Mavrudieva, D. et al., "Magnetic structures for contactless temperature sensor," Sensors and Actuators A, vol. 142 (2008), pp. 464-467.

Kim, Y. H. et al., "Remote Temperature Sensing System Using Reverberated Magnetic Flux," IEEE Transactions on Magnetics, vol. 36, No. 5, Sep. 2000, pp. 3643-3645.

Naoe, M et al., "Basic investigation of microtemperature sensor by means of a novel transmission-line technique using a temperature-sensitive Li—Zn—Cu ferrite substrate," Journal of Magnetism and Magnetic Materials, vol. 320 (2008), pp. e949-e953.

Weaver, J. B. et al., "Magnetic nanoparticle temperature estimation," Med. Phys., vol. 35, No. 5, May 2009, pp. 1822-1829.

* cited by examiner

THERMOMAGNETIC RESONATOR-BASED TEMPERATURE SENSING

CROSS-REFERENCE TO RELATED APPLICATIONS

This application claims priority from U.S. Provisional Patent Application Ser. No. 61/798,767, filed Mar. 15, 2013, the entire contents of which is incorporated herein by reference.

STATEMENT REGARDING FEDERALLY SPONSORED RESEARCH OR DEVELOPMENT

N/A

BACKGROUND

1. Technical Field

The invention relates to systems and methods of measuring and testing. In particular, the invention relates to temperature sensors and measuring with temperature sensors.

2. Description of Related Art

Temperature is often an important system parameter to measure or monitor. In particular, temperature is often monitored to one or more of control an operational characteristic, improve efficiency and assure the safe operation of a device or system. For example, temperature may be measured to determine if a device is operating within a range that is deemed acceptable. If the temperature is determined to be either outside of the acceptable temperature range or exhibiting abnormal fluctuations, steps can be taken to adjust the temperature, for example by initiating either cooling or heating of the device. Alternatively, an operational characteristic of the device (e.g., power consumption) may be altered to maintain an acceptable operating temperature of the device. In other examples, system parameters of thermodynamic systems such as turbine engines or internal combustion engines can be optimized based on the real-time temperature information to achieve one or both of high efficiency and best performance. In yet other examples, temperature may be monitored to characterize an operational state or condition of the device or system. For example, a system may undergo an increase in temperature that, when a predetermined temperature is reached, indicates that the system has reached a goal state or condition. Monitoring or measuring the system temperature may be used to determine whether the goal has been achieved, and further may provide feedback to a controller that progress is being made by the system towards the goal.

Unfortunately, measuring temperature of a device or system may present certain challenges in many practical situations. For example, it may be useful to directly measure a temperature internal to a device instead of a surface temperature of the device. The internal temperature may be more meaningful than the surface temperature for various monitoring situations, for example. However, monitoring an internal temperature may present various practical difficulties, especially when it is difficult or even impossible to run wires into the device or system. For example, the device may be housed in a sealed container. Passing wires associated with a conventional temperature sensor (e.g., a thermal couple) through the container to measure the internal temperature may not be possible or practical in certain situations. In other examples, such as for temperature distribution mapping within a device, providing sensor leads to and from multiple temperature sensors at numerous points within the device may be impractical, may interfere with the mapping itself, and even may be detrimental to device operation. In yet other examples, a target of the temperature measurement may be a moving part or component of a system (e.g., a turbine blade rotating within a jet engine). Monitoring the temperature of such a moving target may not be practical using a wired temperature sensor, for example.

BRIEF SUMMARY

In some embodiments in accordance with the principles of the present invention, a thermomagnetic temperature sensor is provided. The thermomagnetic temperature sensor comprises a thermomagnetic inductor, a conductor of coil of the thermomagnetic inductor comprising a ferromagnetic material with an engineered, temperature-dependent magnetic permeability (e.g., having an engineered, temperature-induced ferromagnetic to paramagnetic permeability transition). The thermomagnetic temperature sensor further comprises a capacitor connected to the thermomagnetic inductor to form a thermomagnetic resonator having a temperature-dependent resonant frequency determined by the temperature-dependent magnetic permeability. The temperature-dependent resonant frequency of the thermomagnetic resonator is characterized as a function of temperature.

In some embodiments in accordance with the principles of the present invention, a temperature measurement system is provided. The temperature measurement system comprises a thermomagnetic temperature probe comprising a ferromagnetic material and a resonator. The ferromagnetic material has a temperature-dependent magnetic permeability that decreases monotonically as a function of temperature between a maximum value at a temperature below a Curie temperature of the ferromagnetic material and the Curie temperature. The resonator has a resonant frequency determined by the temperature-dependent magnetic permeability of the ferromagnetic material and the connected capacitor. The temperature measurement system further comprises a temperature measurement apparatus to measure a temperature of the thermomagnetic temperature probe using the resonant frequency according to a predetermined relationship between temperature and the resonant frequency.

In some embodiments in accordance with the principles of the present invention, a method of measuring temperature is provided. The method of measuring temperature comprises providing a thermomagnetic temperature sensor in an environment. The provided thermomagnetic temperature sensor comprises a ferromagnetic material and a resonator. The ferromagnetic material has a temperature-dependent magnetic permeability with a monotonically decreasing value between a temperature corresponding to a maximum value below a Curie temperature of the ferromagnetic material and the Curie temperature. The resonator has a resonant frequency determined by the temperature-dependent magnetic permeability and the connected capacitor. The method of measuring temperature further comprises measuring the resonant frequency of the resonator. The method of measuring temperature further comprises determining a temperature local to the thermomagnetic temperature sensor according to a predetermined relationship between the temperature-dependent resonant frequency and temperature.

BRIEF DESCRIPTION OF THE DRAWINGS

Various features of embodiments in accordance with the principles of the present invention described herein may be more readily understood with reference to the following detailed description taken in conjunction with the accompanying drawings, where like reference numerals designate like structural elements, and in which.

Certain embodiments according to the principles of the present invention have other features that are one of in addition to and in lieu of the features illustrated in the above-referenced figures. These and other features are detailed below with reference to the above-referenced figures.

DETAILED DESCRIPTION

Embodiments consistent with the principles of the present invention as described herein provide remote determination or measurement of a temperature. The measured temperature may be a temperature of or internal to a device or structure, for example. In particular, the temperature of a device or structure may be measured by an effect that the temperature has on a resonant frequency of a thermomagnetic temperature sensor or probe located within the device or structure as measured by a resonant frequency measurement. Further, the temperature is measured remotely using the resonant frequency measurement without direct contact (e.g., electrical contact, physical contact, etc.) with the thermomagnetic temperature sensor or probe, according to some embodiments. The sensing of temperature and especially the remote sensing of temperature, according to the principles of the present invention as described herein, may facilitate measuring temperature internal to a device or structure where it may be difficult or substantially impossible to run wires to perform the measurement using conventional (e.g., wired) temperature sensors, in some examples. In addition, magnetic sensing according to embodiments of the present invention may enable high penetration detection to obtain the internal temperature information of the device or structure.

Figure 1:
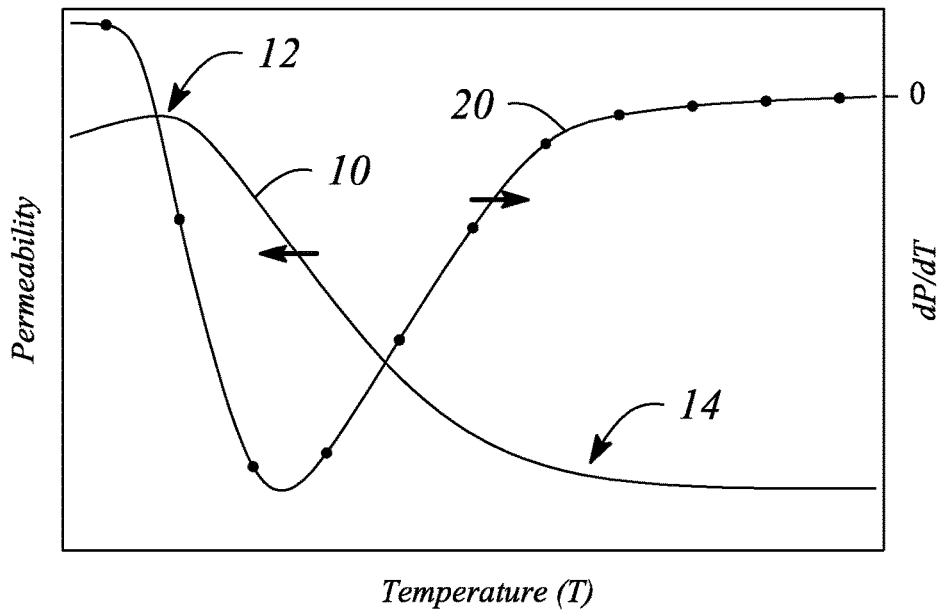
FIG. 1 illustrates a graph of a magnetic property of an example ferromagnetic material as a function of temperature, according to an embodiment consistent with the principles of the present invention.

FIG. 1 illustrates a graph of a magnetic property of an example ferromagnetic material as a function of temperature, according to an embodiment consistent with the principles of the present invention. The variation of the magnetic property of the ferromagnetic material as a function of temperature is often referred to as a 'thermomagnetic effect.' In particular, FIG. 1 illustrates a temperature-dependent variation in magnetic permeability 10 as a function of temperature that is characteristic of ferromagnetic materials used in the thermomagnetic probe, according to various examples. The temperature-dependent magnetic permeability 10 of the ferromagnetic material exhibits a maximum or peak value, known as the Hopkinson peak 12, and a Curie point or Curie temperature 14. The Curie temperature 14 is a temperature at which the example ferromagnetic material undergoes a transition and becomes substantially paramagnetic, by definition herein. As illustrated, the temperature-dependent magnetic permeability 10 decreases monotonically from the maximum value at the Hopkinson peak 12 to an effective paramagnetic magnetic permeability at the Curie temperature 14 with increasing or decreasing temperature. In some examples (e.g., as illustrated), the temperature-dependent magnetic permeability 10 may increase (e.g., have a positive slope) as a function of increasing temperature below the temperature of the Hopkinson peak 12.

FIG. 1 also illustrates a curve representing a first derivative 20 of magnetic permeability with respect to temperature. The magnetic permeability derivative 20 typically includes a maximum value at a temperature below the temperature of the Hopkinson peak 12 and a minimum value between the temperature of the Hopkinson peak 12 and the Curie temperature 14 of the ferromagnetic material. In some examples, the maximum value of the magnetic permeability derivative 20 may be slightly positive at a temperature below the temperature of the Hopkinson peak 12 due to the positive slope of the temperature-dependent magnetic permeability 10. The magnetic permeability derivative 20 is negative thereafter and typically becomes substantially zero at temperatures above the Curie temperature 14, as illustrated in FIG. 1.

Herein, skin depth δ of a current in a conductor or wire may be expressed by equation (1) as $$\delta = \sqrt{\frac{2\rho}{2\pi f \cdot \mu_0 \cdot \mu_r}} \quad (1)$$

where ρ is resistivity of the conductor, f is a frequency of the current, $\mu_0$ is the permeability of free space ($\mu_0 = 4\pi \times 10^{-7}$ N A$^{-2}$), and $\mu_r$ is the relative magnetic permeability. The skin depth δ is a depth inside the conductor at which a current density has fallen to about 1/e (i.e., about 0.37) of a current density value at a surface of the conductor. Choosing a frequency f that provides a skin depth δ greater than a thickness of the conductor may insure that the current flowing in the conductor includes most of the conductor thickness, according to some examples.

In a conductor comprising a ferromagnetic material, the relative magnetic permeability $\mu_r$ may be a function of temperature. Since, in general, magnetic fields may exist both external and internal to a conductor such as a wire, inductance of an inductor comprising a wire conductor may be related to a change in the relative magnetic permeability due to temperature. For example, an internal inductance $L_{int}$ of a wire inductor may be given by equation (2) as $$L_{int} = \frac{\mu_0 \cdot \mu_r}{8\pi} \quad (2)$$

As such, if the relative magnetic permeability $\mu_r$ changes due to a change in the temperature of the wire inductor, a total inductance L of the wire inductor will change (i.e., $L=L_{int}+L_{ext}$).

As used herein, the article 'a' is intended to have its ordinary meaning in the patent arts, namely 'one or more'. For example, 'a coil' means one or more coils and as such, 'the coil' means 'the coil(s)' herein. Also, any reference herein to 'top', 'bottom', 'upper', 'lower', 'up', 'down', 'front', back', 'left' or 'right' is not intended to be a limitation herein. Herein, the term 'about' when applied to a value generally means within the tolerance range of the equipment used to produce the value, or in some examples, means plus or minus 20%, or plus or minus 10%, or plus or minus 5%, or plus or minus 1%, unless otherwise expressly specified. Further, herein the term 'substantially' as used herein means a majority, or almost all, or all, or an amount with a range of about 51% to about 100%, for example. Moreover, examples herein are intended to be illustrative only and are presented for discussion purposes and not by way of limitation.

Figure 2:
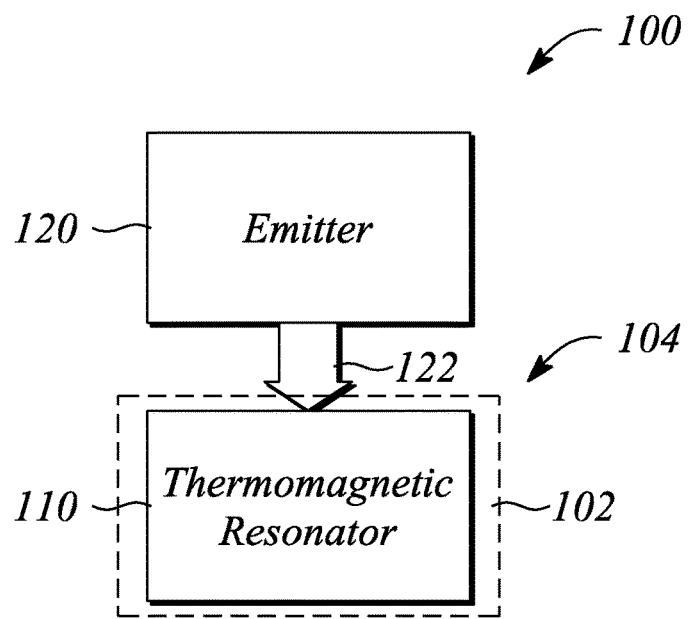
FIG. 2 illustrates a schematic block diagram of a thermomagnetic temperature sensor, according to an embodiment consistent with the principles of the present invention.

FIG. 2 illustrates a block diagram of a thermomagnetic temperature sensor 100, according to an embodiment consistent with the principles of the present invention. The thermomagnetic temperature sensor 100 employs an effect that temperature has on a resonant frequency of the thermomagnetic temperature sensor 100 to determine or measure temperature. For example, the temperature measured may be a temperature of an environment 102 surrounding a sensing portion 104 of the thermomagnetic temperature sensor 100.

In particular, a resonant frequency of the thermomagnetic temperature sensor 100 is determined by temperature. Using a predetermined relationship between the resonant frequency and temperature (e.g., a calibration) the temperature may be measured. Moreover, the resonant frequency of the thermomagnetic temperature sensor 100 may be determined wirelessly or more particularly without a wired or other direct electrical connection to the sensing portion 104 of the thermomagnetic temperature sensor 100. As such, the thermomagnetic temperature sensor 100 may be applicable where direct electrical connection may be difficult or even impossible, for example.

According to various embodiments, the measured temperature is a temperature of the thermomagnetic temperature sensor 100 or equivalently of the environment 102 surrounding the thermomagnetic temperature sensor 100. For example, the measured temperature may be an internal temperature of a device comprising the sensing portion 104 of the thermomagnetic temperature sensor 100. According to some embodiments, the measured temperature is within a predefined range of temperature values. However, while specific examples of the thermomagnetic temperature sensor 100 may exhibit a predefined range of temperatures that may be measured, the predefined range of temperature values may be adjusted or tailored (i.e., engineered) to facilitate measurement of a wide variety of temperature ranges, according to various embodiments.

According to various embodiments, the thermomagnetic temperature sensor 100 comprises a thermomagnetic resonator 110. The thermomagnetic resonator 110, in turn, comprises a resonator and a ferromagnetic material. The thermomagnetic resonator 110 provides the sensing portion 104 of the thermomagnetic temperature sensor 100, for example. According to various embodiments, the ferromagnetic material is configured to influence a resonant frequency of the resonator. In particular, the ferromagnetic material has or exhibits a temperature-dependent magnetic permeability and the resonator has or exhibits a resonant frequency that is determined by the temperature-dependent magnetic permeability of the ferromagnetic material. As such, by definition herein, the thermomagnetic resonator 110 is a resonator or resonant circuit having or exhibiting a temperature-dependent resonant frequency that is determined by the temperature-dependent magnetic permeability of a ferromagnetic material. Further, a relationship (i.e., a predetermined relationship) between temperature and the temperature-dependent resonant frequency is characterized or otherwise known, by definition, for the thermomagnetic resonator 110.

According to various embodiments, the ferromagnetic material of the thermomagnetic resonator 110 may be substantially any ferromagnetic material having a temperature-dependent magnetic permeability. In particular, according to some embodiments, the temperature-dependent magnetic permeability is characterized by a maximum value of the magnetic permeability (i.e., the Hopkinson peak) at a temperature below the Curie point or temperature of the ferromagnetic material. Further, the ferromagnetic material of the thermomagnetic resonator 110 has or exhibits a monotonically decreasing magnetic permeability as a function of temperature between the temperature corresponding to the maximum magnetic permeability value and the Curie temperature, according to various embodiments (e.g., as illustrated in FIG. 1). The monotonically decreasing magnetic permeability as a function of temperature is defined and referred to herein as a 'monotonic temperature-dependent magnetic permeability transition' for that reason.

According to some embodiments, an operating temperature or temperature range of the ferromagnetic material (e.g., one or both of the Curie temperature or a temperature difference between the Curie temperature and the Hopkinson peak temperature) may be engineered for a particular application of the thermomagnetic temperature sensor 100. For example, the ferromagnetic material may be engineered to provide a specific temperature-dependent magnetic permeability variation over a particular range of temperatures. The specific temperature-dependent magnetic permeability variation (i.e., the temperature-dependent magnetic permeability) may then provide the temperature-dependent resonant frequency of the thermomagnetic resonator 110 over that same particular range of temperatures, for example. As such, the ferromagnetic material may have an engineered, temperature-dependent magnetic permeability to provide a temperature-dependent resonant frequency of the thermomagnetic resonator 110 that is adapted to a particular application involving measuring temperature within the particular range of temperatures. For example, the temperature-dependent magnetic permeability may be engineered to provide the thermomagnetic resonator 110 with a range of temperature-dependent resonant frequencies corresponding to a temperature range between about 10 degrees Celsius (° C.) and about 70° C. The temperature range of 10-70° C. may be appropriate for measuring the temperature of a particular battery or battery pack, for example.

According to various embodiments, a thermomagnetic transition of the temperature-dependent magnetic permeability of the ferromagnetic material between the maximum magnetic permeability and the Curie temperature value is substantially similar (e.g., exhibits little or no hysteresis) regardless of whether the ferromagnetic material is being heated or cooled. That is, the monotonic temperature-dependent magnetic permeability transition or change is substantially similar (e.g., follows a substantially similar path) regardless of whether the ferromagnetic material is being heated or cooled. As such, the temperature-dependent magnetic permeability may be substantially free of hysteresis, according to various embodiments. Further, the ferromagnetic material of the thermomagnetic resonator 110 explicitly includes both ferromagnetic materials in which substantially all constituent magnetic domains add a positive contribution to a net magnetization as well as materials often referred to as 'ferrimagnetic' materials in which some of the magnetic domains may be anti-aligned, by definition herein.

In some embodiments, the ferromagnetic material of the thermomagnetic resonator 110 comprises nickel (e.g., as a 'pure' metal, or in an alloy, a compound or a mixture). For example, the ferromagnetic material may be a nickel alloy that comprises nickel (Ni) and one or more of iron (Fe), copper (Cu), aluminum (Al), chromium (Cr), gold (Au), palladium (Pd), zinc (Zn) and silicon (Si). A Ni—Cu alloy having about 70% Ni and 30% Cu may be employed as the ferromagnetic material of the thermomagnetic resonator 110, for example. Other ferromagnetic materials that may be employed include, but are not limited to, alloys, compounds or mixtures comprising one or more of cobalt (Co), Fe, gadolinium (Gd) and dsyprosium (Dy), as well as manganese (Mn) and chromium (Cr), which may produce ferromagnetic crystals in combination with other atoms such as bismuth (Bi), arsenic (As) and antimony (Sb) (e.g., MnBi, MnAs, MnSb). Various oxides and compounds including oxygen (O) that exhibit ferromagnetic characteristics including, but not limited to, $Fe_2O_3$, $FeOFe_2O_3$, $NiOFe_2O_3$, $CuOFe_2O_3$, etc., also may be employed as the ferromagnetic material of the thermomagnetic resonator 110. Even if not explicitly listed herein, substantially any material that exhibits a temperature-dependent magnetic permeability having both of the Hopkinson peak and the Curie temperature, as well as the monotonic decrease in the temperature-dependent magnetic permeability between the Hopkinson peak and the Curie temperature as a function of increasing temperature (i.e., the Hopkinson peak is below the Curie temperature), may be used to realize the thermomagnetic resonator 110, according to various embodiments.

As mentioned above, the thermomagnetic resonator 110 comprises a ferromagnetic material that may have an engineered temperature-dependent magnetic permeability. In particular, one or both of the Curie temperature and a slope of the temperature-dependent magnetic permeability may be tailored, adjusted or engineered to be suitable a particular application of the thermomagnetic temperature sensor 100. For example, the Curie temperature of various example nickel alloys may be adjusted by changing a relative percentage composition of Ni and another constituent of the alloy.

Figure 3:
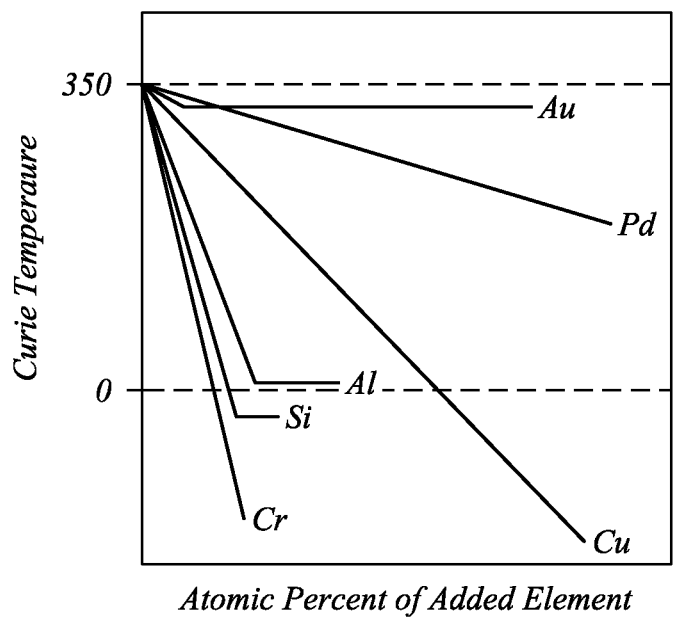
FIG. 3 illustrates a graph depicting Curie temperature engineering, according to an embodiment consistent with the principles of the present invention.

FIG. 3 illustrates a graph depicting Curie temperature engineering, according to an embodiment consistent with the principles of the present invention. In particular, FIG. 3 illustrates a variation of the Curie temperature for various nickel alloys as a function of atomic percent of elements added to the nickel. FIG. 3 is based on FIG. 14-11, page 721 of Bozorth, R., *Ferromagnetism*, D. Van Nostrand Company, 1951, incorporated by reference in its entirety herein. In another example, fabrication conditions such as, but not limited to, sintering temperature instead of or in addition to composition may be used to engineer or adjust one or both of the Curie temperature and the temperature-dependent magnetic permeability slope. See for example, Brito et al., "Evaluation of a Ni—Zn Ferrite for use in Temperature Sensors," Progress in Electromagnetic Research Letters, Vol. 13, 2010, pp. 103-112 incorporated by reference herein.

In various embodiments, a predetermined relationship between the resonant frequency of the thermomagnetic resonator 110 and temperature is used to measure the temperature. That is, the temperature-dependent resonant frequency of the thermomagnetic resonator 110 is characterized as a function of temperature, according to various embodiments. In some examples, the temperature-dependent resonant frequency is characterized as a function of temperature between the Curie temperature and the temperature corresponding to the maximum value of temperature-dependent magnetic permeability (i.e., the Hopkinson peak) of the ferromagnetic material. The characterization may be provided by a calibration of the thermomagnetic temperature sensor 100. Specifically, in some examples, calibration may include measuring the temperature-dependent resonant frequency of the thermomagnetic resonator 110 at a plurality of temperatures and recording the result in a look-up table or calibration curve. The calibration curve or look-up table may then be used to determine or measure the temperature of the thermomagnetic resonator 110 from the temperature-dependent resonant frequency.

According to various examples, the thermomagnetic resonator 110 of the thermomagnetic temperature sensor 100 may be realized using any of a wide variety of resonator configurations. In particular, the thermomagnetic resonator 110 may be realized as an inductor-capacitor (L-C) resonator. For example, the inductor of the L-C resonator may comprise the ferromagnetic material such that magnetic flux of the inductor intersects and is therefore influenced by the temperature-dependent magnetic permeability. An inductance of the inductor as well as the resonant frequency of the L-C resonator may be determined, at least in part, by the temperature-dependent magnetic permeability of the ferromagnetic material to provide the temperature-dependent resonant frequency, for example. In other examples, another ferromagnetic material-loaded resonator configuration may be employed including, but not limited to, a dielectric resonator positioned to magnetically couple to the ferromagnetic material. Note that while all resonators types may be applicable and generally represented schematically herein, it should be understood that, for simplicity of discussion only, the description herein may be focused on L-C resonators without loss of generality or scope.

Figure 4A:
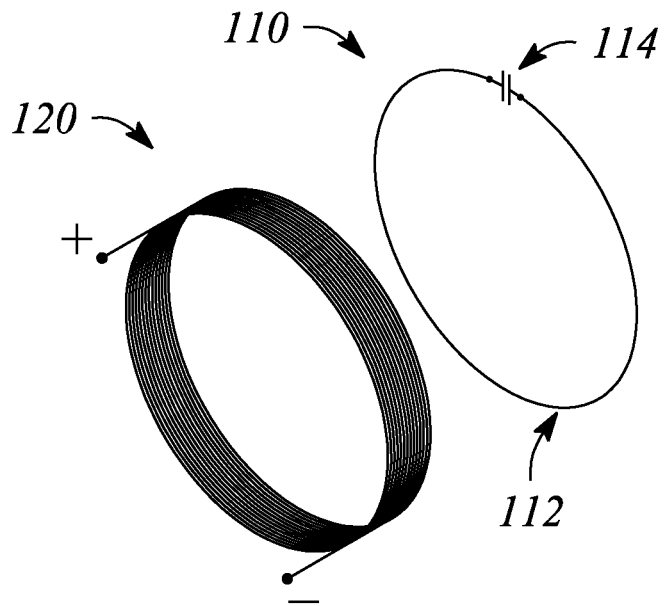
FIG. 4A illustrates a perspective view of a thermomagnetic resonator, according to an embodiment consistent with the principles of the present invention.
Figure 4B:
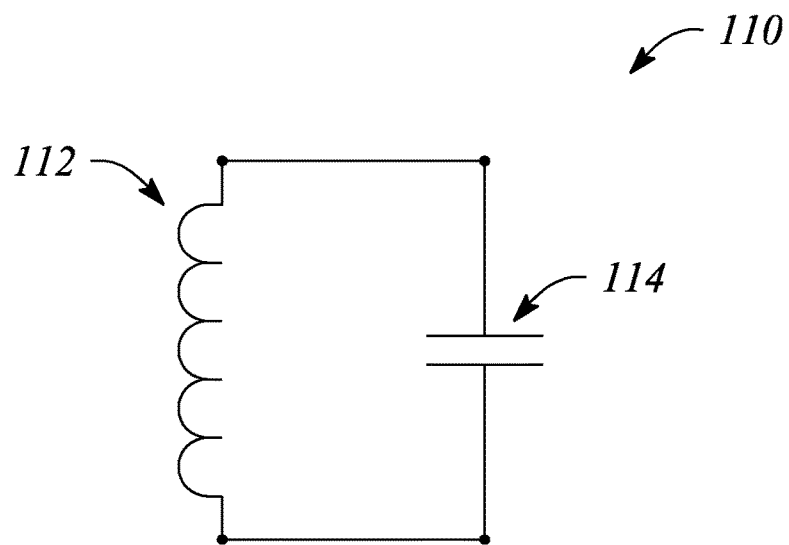
FIG. 4B illustrates a schematic diagram of the thermomagnetic resonator of FIG. 4A, according to an embodiment consistent with the principles of the present invention.

FIG. 4A illustrates a perspective view of a thermomagnetic resonator 110, according to an embodiment consistent with the principles of the present invention. FIG. 4B illustrates a schematic diagram of the thermomagnetic resonator 110 of FIG. 4A, according to an embodiment consistent with the principles of the present invention. As illustrated in FIGS. 4A-4B, the thermomagnetic resonator 110 is in the form of or is configured as an L-C resonator comprising a thermomagnetic inductor 112 connected to a capacitor 114. Further, the thermomagnetic resonator 110 comprises a parallel connection of the thermomagnetic inductor 112 and the capacitor 114, as illustrated. In particular, the thermomagnetic inductor 112 illustrated in FIG. 4A comprises a single turn coil. Each end of the single turn coil of the thermomagnetic inductor 112 is connected to a different terminal of the capacitor 114, as illustrated in FIG. 4A, to form the thermomagnetic resonator 110. FIG. 4B illustrates a generic representation of the thermomagnetic resonator 110 in the parallel L-C resonator configuration. As illustrated in FIG. 4B, the thermomagnetic inductor 112 may comprise a one or more coils, for example. Further, as illustrated in FIG. 4B, the thermomagnetic inductor 112 is connected in parallel to the two terminals of the capacitor 114 to realize the L-C resonator configuration. In other examples (not illustrated), a series connection of a thermomagnetic inductor and a capacitor may be employed to realize the thermomagnetic resonator 110 in the form of an L-C resonator. Note that internal and other parasitic resistances (e.g., of the thermomagnetic inductor 112) are assumed to be small and thus are ignored for simplicity of discussion herein.

According to various examples, the thermomagnetic inductor 112 is an inductor comprising a ferromagnetic material. In particular, the thermomagnetic inductor 112 may comprise a wire or conductor made from the ferromagnetic material that is formed or otherwise provided in the shape of a coil. For example, the thermomagnetic inductor 112 illustrated in FIG. 4A is a single turn coil (e.g., a wire loop) in which a conductor of the coil comprises the ferromagnetic material. In some examples, substantially an entire length of the wire or conductor of the coil comprises the ferromagnetic material. For example, the conductor or wire of the thermomagnetic inductor 112 may be made substantially from the ferromagnetic material. In other examples, only a portion of the wire or conductor is the ferromagnetic material. In yet other examples, the thermomagnetic inductor 112 may comprise a conductor disposed around a magnetic core that comprises the ferromagnetic material. For example, the thermomagnetic inductor 112 may be a ferromagnetic core coil inductor.

According to various embodiments, a specific value of inductance of the thermomagnetic inductor 112 and a specific value of capacitance of the capacitor 114 is predetermined to provide a resonant frequency either at a predetermined frequency or within a predetermined frequency range. For example, a nominal inductance at room temperature of the thermomagnetic inductor 112 and the nominal capacitance of the capacitor 114 may be selected to produce a nominal resonant frequency of the thermomagnetic resonator 110 in a predetermined range from about 10 hertz (Hz) to less than about 500 kilohertz (kHz). The temperature-dependent resonant frequency is temperature-induced displacement or variation from the nominal resonant frequency. As such, the temperature-dependent resonant frequency may also be in the predetermined range (e.g., between about 10 Hz and about 500 kHz), according to some examples. Further, a nominal resonant frequency may be used to uniquely distinguish individual thermomagnetic resonators 110 in a plurality of thermomagnetic resonators 110 (e.g., of different thermomagnetic temperature sensors 100).

In some examples, additional elements (e.g., other capacitors and inductors) may be employed to realize the thermomagnetic resonator 110 in combination with the thermomagnetic inductor 112 and capacitor 114. For example, a switch (not illustrated) may be employed to modulate the thermomagnetic resonator 110. In another example, the thermomagnetic resonator 110 may be connected to a circuit such as, but not limited to, a radio frequency identification (RFID) circuit.

Referring again to FIG. 2, in some embodiments, the thermomagnetic temperature sensor 100 further comprises an emitter 120. The emitter 120 is configured to excite the thermomagnetic resonator 110 with an excitation 122 (e.g., an excitation signal). In some embodiments, the emitter 120 wirelessly excites the thermomagnetic resonator 110. In particular, the emitter 120 may be spaced apart from the thermomagnetic resonator 110 and configured to wirelessly couple to and excite the thermomagnetic resonator 110 at the temperature-dependent resonant frequency. In some examples, the wireless excitation 122 may include a frequency or a range of frequencies around the temperature-dependent resonator frequency of the thermomagnetic resonator 110. In some examples, a peak in a response of the thermomagnetic resonator 110 to the excitation 122 may be used to determine the temperature-dependent resonant frequency and, by extension, the temperature.

In some embodiments, the emitter 120 is configured to magnetically couple to the thermomagnetic resonator 110 to provide the excitation 122. For example, the emitter 120 may magnetically couple to the coil of the thermomagnetic inductor 112 of the thermomagnetic resonator 110, in some embodiments. The emitter 120 may comprise a coil or another magnetic emitting structure spaced apart from the thermomagnetic resonator 110, for example. The coil of the emitter 120 may be configured to produce an alternating magnetic field H that magnetically couples to the coil of the thermomagnetic inductor 112 as the excitation 122, according to some examples.

According to some embodiments (e.g., see FIG. 4A), the emitter 120 may comprises a multi-turn coil. For example, the multi-turn coil may comprise between about ten and about forty (e.g., about thirty-three) turns or loops of wire. The turns or loops of wire may be wound around a cylindrical form (e.g., a cylinder or tube of dielectric material, etc.), for example. Note that for magnetic coupling, a relative orientation of the coil of the emitter 120 and the coil of the thermomagnetic inductor 112 may be substantially unimportant. For example, the respective coils of the emitter 120 and the thermomagnetic inductor 112 do not necessarily need to be aligned as illustrated in FIG. 4A. Generally, as long as a magnetic field couples the coils, the relative orientation may be substantially arbitrary, in practice. For example, little or no magnetic field coupling may exist when the respective coils of the emitter 120 and the thermomagnetic inductor 112 are substantially orthogonal to one another. However, most other orientations of the coils generally may be used.

In various embodiments, the alternating magnetic field H or equivalently an AC current in the coil of the emitter 120 used to produce the alternating magnetic field H has a predetermined maximum frequency and a predetermined minimum frequency. The predetermined maximum and minimum frequencies may bracket an expected temperature-dependent resonant frequency of the thermomagnetic resonator 110, for example. According to various embodiments, the AC current may be provided by a network analyzer, an impedance meter, or a similar apparatus, for example. The provided AC current may be introduced into the coil of the emitter 120 at positive (+) and negative (−) terminals of the emitter coil (e.g., as illustrated in FIG. 4A), for example. As described below, either in addition to or as an alternative to using the skin depth δ, the predetermined maximum frequency of the alternating magnetic field H may be established by a limited ability of the alternating magnetic field H to penetrate to an object, device or structure being measured using the thermomagnetic temperature sensor 100.

In particular, in some embodiments, the alternating magnetic field H or a similar excitation 122 as well as the temperature-dependent resonant frequency of the thermomagnetic resonator 110 may have a predetermined maximum frequency of less than about 500 kHz. In some examples, the predetermined maximum frequency may be less than about 10 kHz. In some examples, the predetermined maximum frequency is less than about 500 Hz. For example, the alternating magnetic field frequency may be between about 10 Hz and about 500 kHz to correspond to the temperature-dependent resonant frequency of the thermomagnetic resonator 110 (e.g., also between about 10 Hz and 500 kHz). In other examples, the alternating magnetic field H and the temperature-dependent resonant frequency may have a predetermined minimum frequency that is greater than about 10 Hz and a predetermined maximum frequency that is less than about 10 kHz. For example, the frequency may be between about 100 Hz (e.g., the predetermined minimum frequency) and 200 Hz (e.g., the predetermined maximum frequency). In another example, the frequency may be between about 110 Hz and 750 Hz. In yet another example, the frequency may be about 120-130 Hz.

In other embodiments (not illustrated), the emitter 120 may comprise another means for wirelessly exciting the thermomagnetic resonator 110 including, but not limited to, a radio frequency (RF) transmitter and a microwave transmitter. Similarly, the excitation 122 may be an RF excitation 122 or microwave excitation 122, for example. In these embodiments, the thermomagnetic temperature sensor 100 may include an antenna. The antenna may be used to receive an RF excitation 122 or a microwave excitation 122 from the emitter 120, for example. A frequency of the RF transmitter or the microwave transmitter used to wirelessly excite the thermomagnetic resonator 110 via the antenna may differ from a frequency of the temperature-dependent resonant frequency within thermomagnetic resonator 110, in some embodiments. For example, the thermomagnetic temperature sensor 100 may further comprise frequency conversion circuits to convert a frequency of an RF frequency or a microwave frequency to a frequency corresponding with the temperature-dependent resonant frequency of thermomagnetic resonator 110.

In some examples, the alternating magnetic field H or alternatively another excitation 122 provided by the emitter 120 may have a frequency that is below a frequency determined by a skin depth ($\delta$, e.g., see equation (1) above) of an alternating current $I_{ac}$ induced in a conductor of the thermomagnetic inductor 112 by the excitation 122. Further, the resonant frequency (e.g., a nominal value thereof) of the thermomagnetic resonator 110 may be selected to correspond to frequency determined by the skin depth. In particular, the frequency of the induced alternating current $I_{ac}$ in the conductor provided by the emitter excitation 122 may be less than a frequency at which the skin depth is greater than a substantial portion of a thickness of the conductor of the thermomagnetic inductor 112. For example, the frequency may be selected to provide a skin depth that is greater than about one half of a thickness of the conductor of the coil of the thermomagnetic inductor 112.

According to some embodiments, basing the frequency of the induced alternating current $I_{ac}$ on the skin depth may facilitate an influence that the ferromagnetic material has on the resonant frequency of the thermomagnetic resonator 110. In particular, if the induced alternating current $I_{ac}$ has a skin depth that extends well into the conductor, an amount of magnetic field inside the conductor will be increased or even may be maximized, in some examples. In turn, the overlap between the internal magnetic field and the ferromagnetic material of the conductor is also increased or maybe even maximized, either of which may lead to maximization of an effect that the temperature-dependent magnetic permeability has on the inductance of the thermomagnetic inductor 112, according to various embodiments. For example, if the conductor of thermomagnetic inductor 112 comprises the ferromagnetic material, limiting the induced alternating current $I_{ac}$ frequency according to the skin depth $\delta$ increases an overlap between the ferromagnetic material and the magnetic field associated with the induced alternating current $I_{ac}$ (e.g., the magnetic field internal to the conductor). The increased overlap, in turn, increases the influence of the ferromagnetic field on the inductance. See for example, equation (2) above.

Figure 5A:
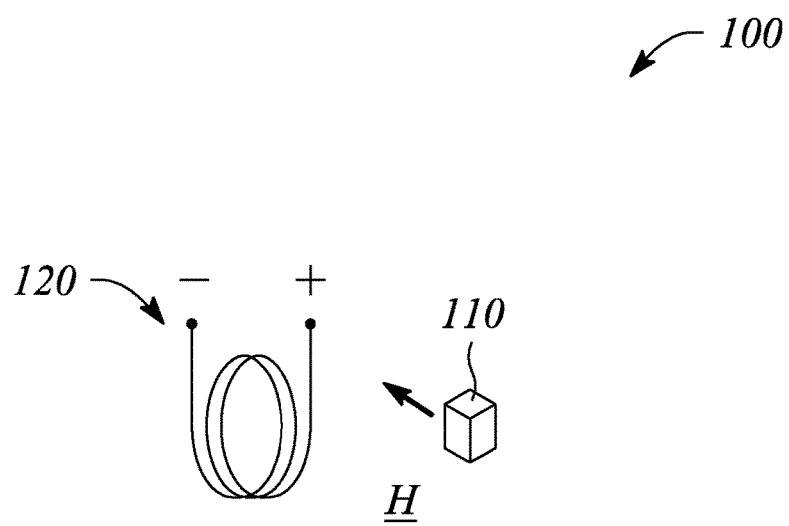
FIG. 5A illustrates a schematic view of a thermomagnetic temperature sensor having a mobile thermomagnetic resonator, according to example consistent with the principles of the present invention.

In some embodiments, both the emitter 120 and the thermomagnetic resonator 110 are substantially stationary or at least stationary relative to one another. In other embodiments, the emitter 120 is substantially stationary and the thermomagnetic resonator 110 is configured to be mobile with respect to the stationary emitter 120. By 'stationary' it is meant that the stationary emitter 120 (e.g., a coil thereof) is fixed with respect to a local frame of reference, while by 'mobile' it is meant that the thermomagnetic resonator 110 is configured to move relative to the local reference frame. FIG. 5A illustrates a schematic view of a thermomagnetic temperature sensor 100 having a mobile thermomagnetic resonator 110, according to example consistent with the principles of the present invention. Motion of the thermomagnetic resonator 110 is illustrated by a heavy arrow in FIG. 5A. Also illustrated is an alternating magnetic field H provided by the coil of the stationary emitter 120.

In some embodiments, the thermomagnetic temperature sensor 100 further comprises a rotating member such as, but not limited to, a wheel. The mobile thermomagnetic resonator 110 may be located on and be configured to move with the rotating member, while the emitter 120 may be arranged adjacent to the rotating member, according to various embodiments. As the rotating member rotates, the thermomagnetic resonator 110 may move or rotate past the stationary emitter 120, for example.

Figure 5B:
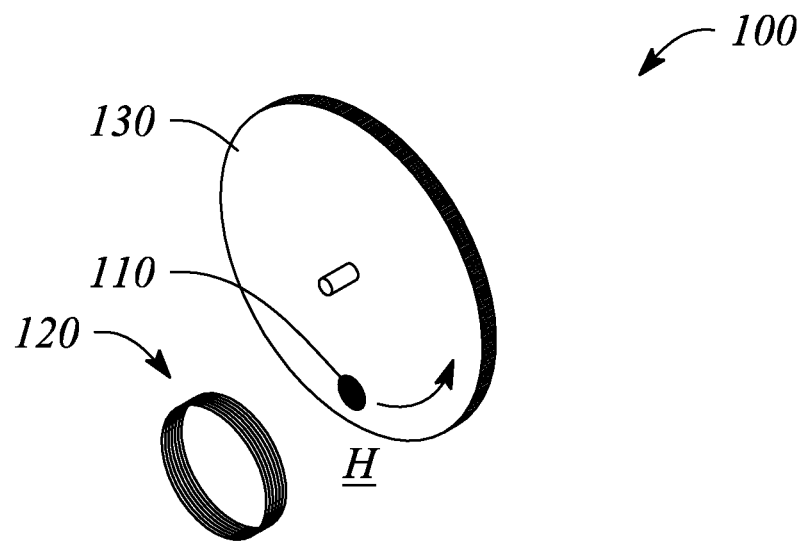
FIG. 5B illustrates a perspective view of a thermomagnetic temperature sensor having a rotating member, according to example consistent with the principles of the present invention.

FIG. 5B illustrates perspective view of a thermomagnetic temperature sensor 100 having a rotating member 130, according to example consistent with the principles of the present invention. The rotating member 130 may be a disk or wheel mounted to rotate on or about an axle, for example. As illustrated, the thermomagnetic resonator 110 is located on the rotating member 130, while a coil of a stationary emitter 120 is located adjacent to a side of the rotating member 130. As the rotating member 130 rotates, the thermomagnetic resonator 110 passes by the stationary emitter 120. A resonance measurement taken at a predetermined point in the rotation of the rotating member 130 may be used to determine a temperature local to the thermomagnetic resonator 110, according to various embodiments. The predetermined point may be a point of closest approach between the thermomagnetic resonator 110 and the coil of the emitter 120, for example.

According to some embodiments of the present invention, a temperature measurement system is provided. For example, the temperature measurement system may measure the temperature of an environment or a device such as, but not limited to, a battery, a portion of an engine (e.g., a rotating portion internal to the engine), etc. Other applications of the temperature measurement system include, but are not limited to, internal combustion engines, motors, and turbine engines that may benefit from internal temperature information to achieve high efficiency and performance, for example.

Figure 6:
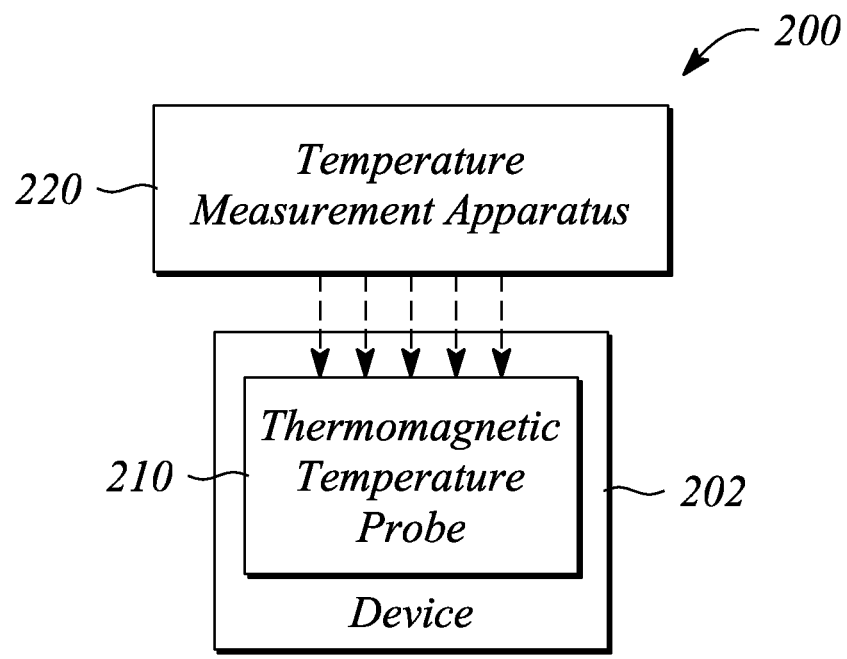
FIG. 6 illustrates a block diagram of a temperature measurement system, according to an embodiment consistent with the principles of the present invention.

FIG. 6 illustrates a block diagram of a temperature measurement system 200, according to an embodiment consistent with the principles of the present invention. The temperature measurement system 200 is configured to measure a temperature of an environment including, but not limited to, an internal temperature of an apparatus or device 202 including, but not limited to, a battery, for example. When used to measure a battery temperature, the temperature measurement system 200 is not limited to a particular battery type or battery configuration.

For example, the device 202 may comprise a battery having a cylindrical, a prismatic, or another configuration. Further, the battery may employ virtually any battery technology (e.g., either rechargeable or non-rechargeable) including, but not limited to, nickel-cadmium (NiCd) technology, nickel-metal hydride (NiMH) technology, alkaline technology, and various types of lithium-ion technologies. The internal temperature of the battery may be measured by the temperature measurement system 200 remotely, according to some embodiments. Note that, while referred to as a 'battery', the battery may comprise a plurality of cells (e.g., a plurality of separate batteries). As such, the temperature measurement system 200 may provide an internal temperature of a plurality of battery cells grouped together to form 'battery,' according to some embodiments. Further, in some embodiments, the temperature measurement system 200 may be used to measure a temperature of another energy storage-type device instead of the battery, for example, a supercapacitor. The temperature measurement system 200 even may be used to measure temperature of an environment (e.g., other than a device or a battery) that is local to the temperature measurement system 200, according to some embodiments. In some embodiments, the temperature measurement system 200 may be configured to measure temperature at a plurality of different points or locations within the environment (e.g., the device 202).

As illustrated in FIG. 6, the temperature measurement system 200 comprises a thermomagnetic temperature probe 210. According to various embodiments, the thermomagnetic temperature probe 210 comprises a ferromagnetic material and a resonator. Further according to various embodiments, the ferromagnetic material has a temperature-dependent magnetic permeability that decreases monotonically as a function of temperature between a maximum value at a temperature below a Curie temperature of the ferromagnetic material and the Curie temperature. The resonator has a resonant frequency determined by the temperature-dependent magnetic permeability of the ferromagnetic material, according to various embodiments.

In some embodiments, the thermomagnetic temperature probe 210 is configured to provide wireless temperature measurements, while in other embodiments, the thermomagnetic temperature probe 210 is configured to measure temperature in a wired configuration. For example, the resonator and the ferromagnetic material of the thermomagnetic temperature probe 210 may be substantially similar to the thermomagnetic resonator 110 of the thermomagnetic temperature probe 100, described above. In a wireless temperature-sensing configuration, the resonator of the thermomagnetic temperature probe 210 is excited wirelessly to measure temperature. In other examples, the resonator and the ferromagnetic material may be implemented as a wired resonator. In particular, the resonator may be configured to be excited by a wired connection to facilitate measuring temperature according to the resonant frequency determined by the temperature-dependent magnetic permeability of the ferromagnetic material, according to some embodiments. To measure a temperature at a plurality of different locations, a plurality of thermomagnetic temperature probes 210, each having a unique resonant frequency, may be employed, for example.

In some embodiments, whether configured for wired or wireless temperature measurement, the thermomagnetic temperature probe 210 comprises an inductor connected to a capacitor to form the resonator. For example, the resonator may be an L-C resonator with the inductor and capacitor connected either in a parallel connection or a series connection, or another resonator type. The L-C resonator may be configured either in a wireless configuration or a wired configuration, for example. In particular, the L-C resonator may be excited either by a wireless coupling (e.g., magnetic, electromagnetic, etc.) or through a wired connection to facilitate measurement of temperature according to a temperature-dependent resonant frequency of the L-C resonator.

According to some embodiments, the L-C resonator of the thermomagnetic temperature probe 210 may be substantially similar to the thermomagnetic resonator 110 described above with respect to the thermomagnetic temperature sensor 100. In particular, the thermomagnetic probe 210 may comprise an inductor that substantially similar to the thermomagnetic inductor 112, described above with respect to the thermomagnetic resonator 110. According to these embodiments, a conductor of a coil of the inductor may comprise the ferromagnetic material. For example, the coil may be made from a wire of ferromagnetic material. In other embodiments, the inductor comprises a conductor (e.g., a coil of wire) disposed around a magnetic core, the magnetic core comprising the ferromagnetic material (e.g., as a ferromagnetic core inductor). The thermomagnetic temperature probe 210 may further comprise a capacitor (e.g., connected as illustrated in FIGS. 4A-4B) that is substantially similar to the capacitor 114 described with respect to the thermomagnetic resonator 110, in some embodiments.

According to various embodiments, the temperature measurement system 200 further comprises a temperature measurement apparatus 220. The temperature measurement apparatus 220 is configured to measure a temperature of the thermomagnetic temperature probe 210 using the resonant frequency according to a predetermined relationship between temperature and the resonant frequency determined by the temperature-dependent magnetic permeability of the ferromagnetic material. As described above, the predetermined relationship between temperature and the resonant frequency may be provided by a calibration of the thermomagnetic temperature probe 210, according to various embodiments.

In some embodiments, the temperature measurement apparatus 220 comprises an emitter spaced apart from the thermomagnetic temperature probe 210. The emitter may be substantially similar to the emitter 120 described above with respect the thermomagnetic temperature sensor 100. In particular, the spaced-apart emitter of the temperature measurement apparatus 220 may be configured to magnetically couple to an inductor of the thermomagnetic temperature probe 210, according to some embodiments. The emitter may comprise a coil, for example, that is spaced apart from thermomagnetic temperature probe 210. The coil of the emitter may be configured to magnetically couple to a coil of the thermomagnetic temperature probe coil (e.g., as illustrated in FIG. 4A or 5A), for example.

In other embodiments, the thermomagnetic temperature probe 210 may further comprise an antenna. The antenna may be coupled to the resonator of the thermomagnetic temperature probe 210. The antenna may be configured to couple the temperature measurement apparatus 220 to the resonator. Further, the antenna is configured to facilitate determination of the resonant frequency of the resonator by the temperature measurement apparatus 220. For example, the temperature measurement apparatus 220 may further comprise an antenna that is compatible with the antenna of the thermomagnetic probe 210. Electromagnetic coupling of an excitation signal (e.g., an RF signal or a microwave signal) between the thermomagnetic temperature probe antenna and the antenna of the temperature measurement system may be used to excite the resonator and measure the resonant frequency thereof, for example.

In some embodiments, the temperature measurement apparatus 220 further comprises an impedance measurement system. The impedance measurement system is configured to drive the emitter and determine an impedance of the resonator as a function of frequency. The impedance measurement system may be a network analyzer, for example. In another example, the impedance measurement system may be an impedance meter. According to various embodiments, the impedance measured by the impedance measurement system has a peak at a frequency corresponding to the temperature-dependent resonator frequency of the thermomagnetic temperature probe 210.

Figure 7:
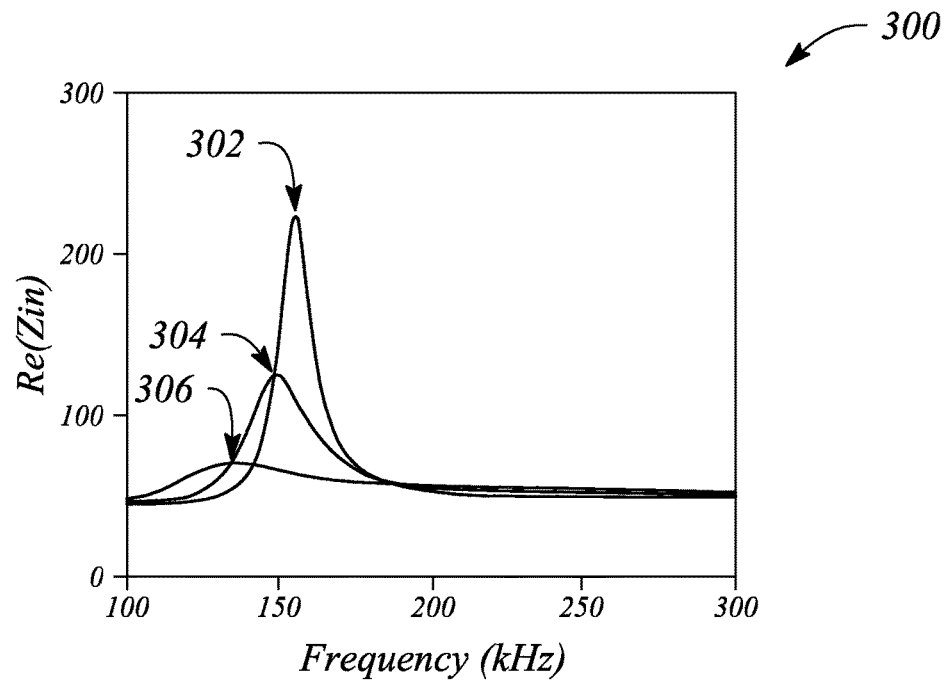
FIG. 7 illustrates a graph representing an input impedance ($Z_{in}$) of an example thermomagnetic temperature probe, according to an embodiment consistent with the principles of the present invention.

FIG. 7 illustrates a graph 300 representing an input impedance ($Z_{in}$) of an example thermomagnetic temperature probe, according to an embodiment consistent with the principles of the present invention. In particular, the graph 300 illustrates the real part of the input impedance $Z_{in}$ of the thermomagnetic temperature probe as a function of frequency and at a plurality of different temperatures. The input impedance $Z_{in}$ may be measured across the positive and negative terminals of the multi-turn emitter coil or the emitter 120 illustrated in FIG. 4A, for example. As illustrated, a first peak 302 in the real part of the input impedance $Re(Z_{in})$ at a first resonant frequency $f_1$ represents a resonant frequency of the thermomagnetic temperature probe at a first temperature $T_1$. Similarly, a second peak 304 illustrated in FIG. 7 occurring at a second frequency $f_2$ corresponds to the thermomagnetic temperature probe resonance at a second temperature $T_2$. The resonance of the thermomagnetic temperature probe at a third temperature $T_3$ is illustrated by a third peak 306 corresponding to a third frequency $f_3$.

Figure 8:
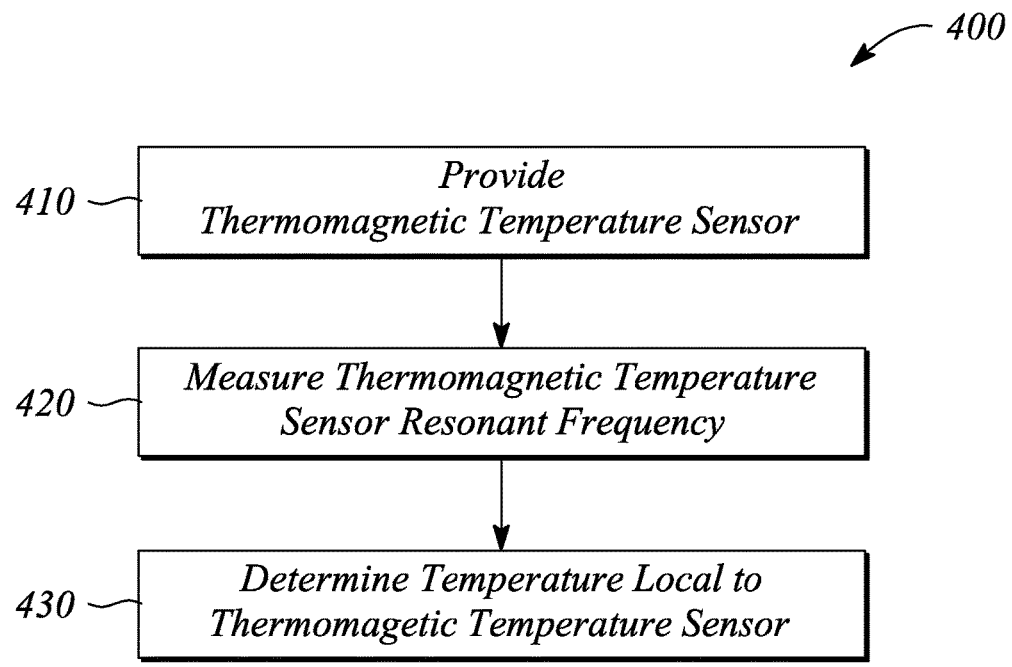
FIG. 8 illustrates a flow chart of a method of measuring temperature, according to an embodiment consistent with the principles of the present invention.

According to some embodiments of the present invention, a method of measuring temperature is provided. FIG. 8 illustrates a flow chart of a method 400 of measuring temperature, according to an embodiment consistent with the principles of the present invention. In particular, the method 400 of measuring temperature employs a temperature-dependent magnetic permeability to measure temperature, according to various embodiments. The temperature-dependent magnetic permeability may be provided by a ferromagnetic material of a thermomagnetic temperature sensor or probe, for example. The temperature may be measured either remotely (e.g., wirelessly) or through a physical connection (e.g., a wired connection), according to various embodiments. When measured remotely, the temperature is measured without physical contact with the thermomagnetic temperature sensor. The measured temperature, according to the method 400, represents a temperature local to the thermomagnetic temperature sensor, according to various embodiments.

The method 400 of measuring temperature comprises providing 410 the thermomagnetic temperature sensor in an environment. In some examples, the environment may be inside a device such as, but not limited to, a battery. According to various embodiments, the provided 410 thermomagnetic temperature sensor comprises a ferromagnetic material and a resonator. The ferromagnetic material has a temperature-dependent magnetic permeability with a monotonically decreasing value between a temperature corresponding to a maximum value below a Curie temperature of the ferromagnetic material and the Curie temperature. The resonator has a resonant frequency determined by the temperature-dependent magnetic permeability. In some embodiments, the thermomagnetic temperature sensor is substantially similar to either the thermomagnetic resonator 110 or the thermomagnetic temperature probe 210, described above with respect to the thermomagnetic temperature sensor 100 and the temperature measurement system 200, respectively.

The method 400 of measuring temperature further comprises measuring 420 a resonant frequency of the resonator of the thermomagnetic temperature sensor. In some examples, the resonant frequency is measured 420 remotely. For example, measuring 420 the resonant frequency may comprise wirelessly coupling to the resonator to excite a resonance within the resonator. According to some embodiments, wirelessly coupling to the resonator comprises magnetically coupling between an emitter coil and a coil of the resonator. The emitter coil may be substantially similar to the emitter 120 described above with respect to the thermomagnetic temperature sensor 100, for example. In other embodiments, an electromagnetic signal may be transmitted to excite the resonance using an antenna.

In other examples, the resonant frequency is measured 420 through a physical or wired connection. For example, measuring 420 the resonant frequency may comprise connecting a measurement apparatus to the thermomagnetic temperature sensor using a wired connection (e.g., a twisted pair of wires). The wired connection is then used to drive the resonator into resonance and the resonant frequency of the resonance is measured 420 (e.g., as a peak in impedance determined as a function of frequency). According to some embodiments, the resonator has a resonant frequency of less than about 500 kHz and greater than about 10 Hz.

The method 400 of measuring temperature further comprises determining 430 a temperature local to the thermomagnetic temperature sensor. According to various embodiments, the temperature is determined 430 according to a predetermined relationship between the temperature-dependent resonant frequency of the thermomagnetic temperature sensor and temperature. In particular, the local temperature is determined 430 according to the predetermined relationship in a temperature range between the temperature corresponding to the maximum value of the temperature-dependent magnetic permeability (i.e., Hopkinson peak) and the Curie temperature of the ferromagnetic material of the thermomagnetic sensor, according to various embodiments. The predetermined relationship may be established by calibration of the thermomagnetic temperature sensor. For example, calibration may provide either a look-up table or a curve that relates the temperature-dependent resonant frequency and the temperature of the thermomagnetic temperature sensor.

Thus, there have been described embodiments of a thermomagnetic temperature sensor, a temperature measurement system and a method of measuring temperature that employ a thermomagnetic effect of a ferromagnetic material on a resonant frequency of a resonator. It should be understood that the above-described embodiments are merely illustrative of some of the many specific examples that represent principles consistent with the principles described herein. Clearly, those skilled in the art can readily devise numerous other arrangements without departing from the scope consistent with the principles described herein as defined by the following claims.

What is claimed is:

1. A thermomagnetic temperature sensor comprising:
a thermomagnetic inductor, a conductor of a coil of the thermomagnetic inductor comprising a ferromagnetic material with an engineered, temperature-dependent magnetic permeability; and
a capacitor connected in parallel to the thermomagnetic inductor to form a thermomagnetic resonator having a temperature-dependent resonant frequency that is determined by the temperature-dependent magnetic permeability,
wherein the temperature-dependent resonant frequency of the thermomagnetic resonator is characterized as a function of temperature.

2. The thermomagnetic temperature sensor of claim 1, wherein the engineered temperature-dependent magnetic permeability is characterized by a maximum value at a temperature below a Curie temperature of the ferromagnetic material, the temperature-dependent magnetic permeability monotonically decreasing as a function of temperature between a temperature corresponding to the maximum value and the Curie temperature, and wherein the temperature-dependent resonant frequency is characterized as a function of temperature between the Curie temperature and the temperature corresponding to the maximum value of the temperature-dependent magnetic permeability.

3. The thermomagnetic temperature sensor of claim 1, wherein the ferromagnetic material of the thermomagnetic inductor coil conductor comprises nickel.

4. The thermomagnetic temperature sensor of claim 1, wherein the temperature-dependent resonant frequency ranges from about 10 hertz to about 500 kilohertz.

5. A thermomagnetic temperature sensor comprising:
a thermomagnetic inductor, a conductor of a coil of the thermomagnetic inductor comprising a ferromagnetic material with an engineered, temperature-dependent magnetic permeability;
a capacitor connected to the thermomagnetic inductor to form a thermomagnetic resonator having a temperature-dependent resonant frequency that is determined by the temperature-dependent magnetic permeability, wherein the temperature-dependent resonant frequency of the thermomagnetic resonator is characterized as a function of temperature; and
an emitter to wirelessly excite the thermomagnetic resonator, the emitter being spaced apart from and magnetically coupled to the thermomagnetic inductor, wherein the emitter comprises an emitter coil spaced apart from the thermomagnetic resonator, the emitter coil to produce a magnetic flux that magnetically couples to the coil of the thermomagnetic inductor.

6. The thermomagnetic temperature sensor of claim 5, wherein the emitter is to employ an alternating magnetic field having a frequency below a frequency at which a skin depth of an induced current in the thermomagnetic inductor is greater than about one half of a thickness of the conductor of the coil of the thermomagnetic inductor.

7. The thermomagnetic temperature sensor of claim 5, wherein the emitter is stationary and the thermomagnetic resonator is configured to be mobile with respect to the stationary emitter.

8. A temperature measurement system comprising the thermomagnetic temperature sensor of claim 5, further comprising an impedance analyzer to drive the emitter and determine an impedance of the thermomagnetic temperature sensor as a function of frequency, the impedance having a peak corresponding to the temperature-dependent resonant frequency.

9. A temperature measurement system comprising:
a thermomagnetic temperature probe comprising a ferromagnetic material and a resonator, the ferromagnetic material having a temperature-dependent magnetic permeability that decreases monotonically as a function of temperature between a maximum value at a temperature below a Curie temperature of the ferromagnetic material and the Curie temperature, the resonator having a resonant frequency determined by the temperature-dependent magnetic permeability of the ferromagnetic material; and
a temperature measurement apparatus to measure a temperature of the thermomagnetic temperature probe using the resonant frequency according to a predetermined relationship between temperature and the resonant frequency,
wherein the temperature measurement apparatus comprises an emitter spaced apart from the thermomagnetic temperature probe, the emitter to be magnetically coupled to an inductor of the thermomagnetic temperature probe.

10. The temperature measurement system of claim 9, wherein the thermomagnetic temperature probe comprises an inductor connected to a capacitor to form the resonator, a conductor of a coil of the inductor comprising the ferromagnetic material.

11. The temperature measurement system of claim 9, wherein the temperature measurement apparatus further comprises an impedance measurement system to drive the emitter and determine an impedance of the resonator as a function of frequency, the impedance to have a peak at a frequency corresponding to the resonant frequency.

12. The temperature measurement system of claim 9, wherein the thermomagnetic temperature probe comprises an inductor connected to a capacitor to form the resonator, the inductor comprising a conductor disposed around a magnetic core comprising the ferromagnetic material.

13. The temperature measurement system of claim 12, wherein the ferromagnetic material of the thermomagnetic temperature probe comprises nickel, and wherein the resonant frequency of the resonator is less than about 500 kilohertz.

14. A temperature measurement system comprising:
a thermomagnetic temperature probe comprising a ferromagnetic material and a resonator, the ferromagnetic material having a temperature-dependent magnetic permeability that decreases monotonically as a function of temperature between a maximum value at a temperature below a Curie temperature of the ferromagnetic material and the Curie temperature, the resonator having a resonant frequency determined by the temperature-dependent magnetic permeability of the ferromagnetic material; and
a temperature measurement apparatus to measure a temperature of the thermomagnetic temperature probe using the resonant frequency according to a predetermined relationship between temperature and the resonant frequency,
wherein the thermomagnetic temperature probe further comprises an antenna coupled to the resonator, the antenna to couple the temperature measurement apparatus to the resonator and to facilitate determination of the resonant frequency of the resonator by the temperature measurement apparatus.

15. A method of measuring temperature, the method comprising:
- providing a thermomagnetic temperature sensor in an environment, the provided thermomagnetic temperature sensor comprising a ferromagnetic material and a resonator, the ferromagnetic material having a temperature-dependent magnetic permeability with a monotonically decreasing value between a temperature corresponding to a maximum value below a Curie temperature of the ferromagnetic material and the Curie temperature, the resonator having a resonant frequency determined by the temperature-dependent magnetic permeability;
- measuring the resonant frequency of the resonator comprising wirelessly coupling to the resonator to excite a resonance of the resonator; and
- determining a temperature local to the thermomagnetic temperature sensor according to a predetermined relationship between the temperature-dependent resonant frequency and temperature.

16. The method of measuring temperature of claim 15, wherein the resonator comprises an inductor connected in parallel to a capacitor, and wherein a conductor of the inductor comprises the ferromagnetic material.

17. The method of measuring temperature of claim 15, wherein wirelessly coupling to the resonator comprising magnetically coupling between an emitter coil and a coil of the resonator.

* * * * *